UNITED STATES PATENT OFFICE.

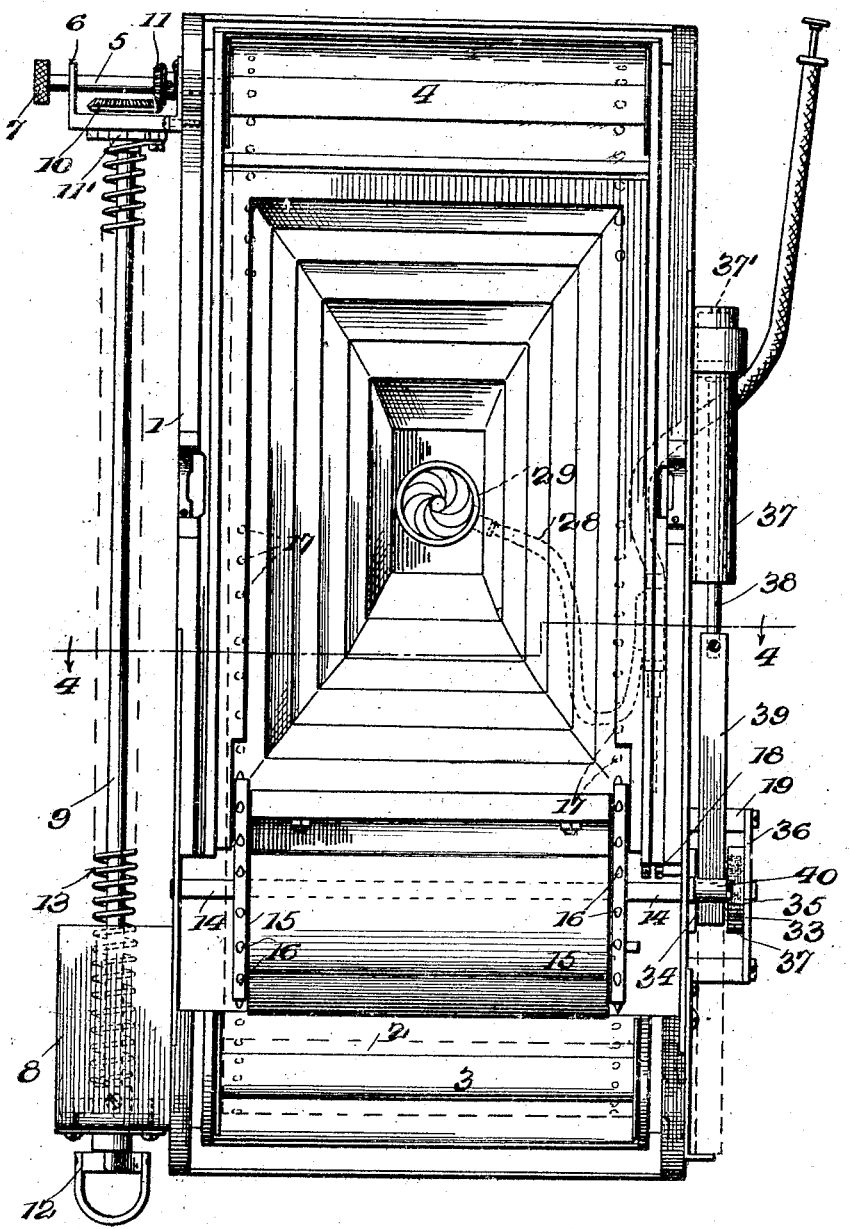

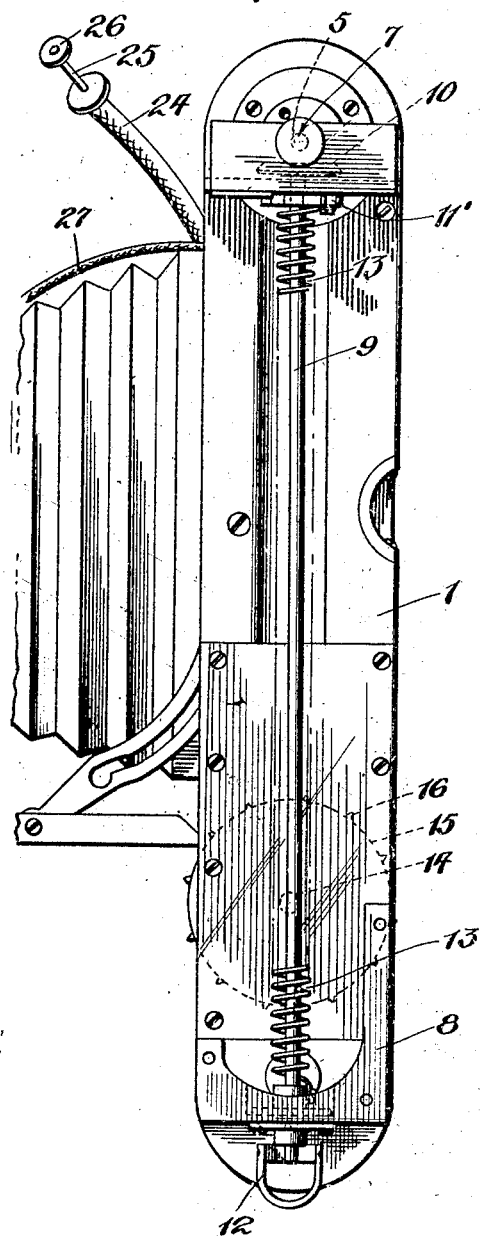
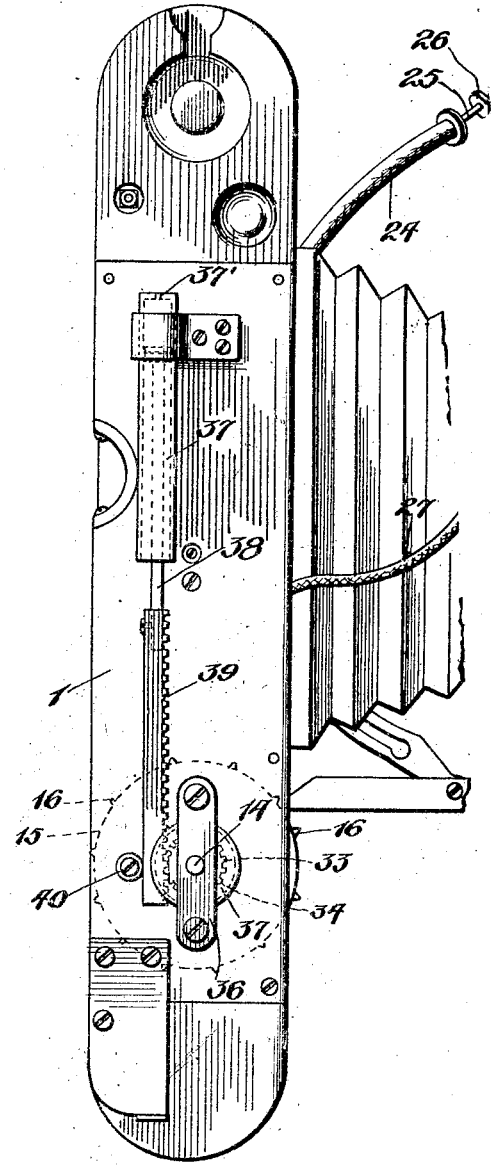

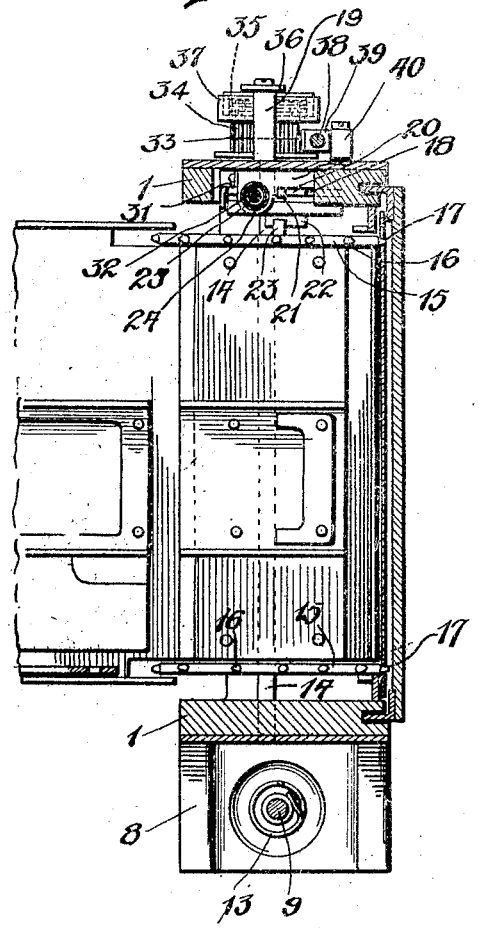
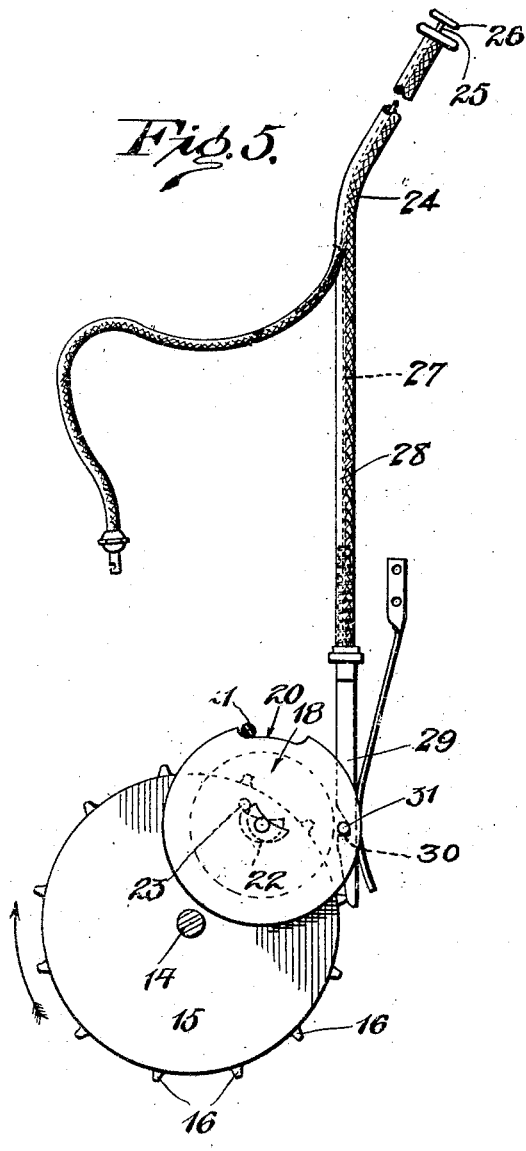

JOHN L. JOHNSON, OF SEATTLE, WASHINGTON.

CAMERA.

1,368,210.  Specification of Letters Patent.  Patented Feb. 8, 1921.

Application filed February 16, 1920. Serial No. 358,871.

*To all whom it may concern:*

Be it known that I, JOHN L. JOHNSON, a citizen of the United States, and residing at Seattle, in the county of King and State of Washington, have invented certain new and useful Improvements in Cameras, of which the following is a specification.

This invention relates to an improvement in cameras, of the type designed to carry a roll film, in which the film is moved successively following the exposure of each picture to present a new section of such film for exposure.

The present invention is particularly directed to means for automatically shifting the film a predetermined distance following the opening of the shutter for the exposure of the particular picture.

The automatic operation follows the shutter operation and is controlled so as to avoid the possibility of exposure of the new section of film, and also to gradually position such new section.

In the drawings:

Figure 1 is a view in elevation, illustrating a camera with the back removed, and having the improvement applied thereto.

Fig. 2 is a side elevation of the same.

Fig. 3 is a similar view taken from the opposite side.

Fig. 4 is a section on line 4—4 of Fig. 1.

Fig. 5 is an enlarged detail, illustrating the release element for the automatic film shifting means.

The improved camera is here shown as the conventional type, and such parts as may be necessary for the proper operation of the camera, and not specifically referred to herein, may be of any preferred or usual type.

For the purpose of this invention, a camera case 1 is provided with the usual means 2, for receiving the roll 3, on which the fresh or new films are rolled. The film roll 4 at the opposite end of the case is mounted in the usual manner, except in the particular hereinafter noted, and is designed to provide the receiving roll, or that roll upon which the films are wound, following exposure. The roll 4 has, for the purpose of this invention, one of its supports extended beyond the camera case as a shaft 5, which shaft is supported in the bracket 6, projecting from the case, and is terminally provided beyond the bracket, with a knurled disk 7, by which the shaft, and thereby the roll, may be turned at will in the initial application of the film.

A second supporting bracket 8 is mounted on the side or end of the case 1, in line with the bracket 6, and the power shaft 9 is rotatably supported in these respective brackets. The end of the shaft mounted in brackets 6 is provided with a beveled pinion 10, arranged to mesh with the beveled pinion 11 on the shaft 5, whereby motion may be transmitted from the shaft 9 to the shaft 5 for the operation of the roll 4. That end of the shaft 9, mounted in the bracket 6, is provided with a stop means, such as pawl and ratchet 11', and below the bracket 8, the shaft is provided with a handle 12, whereby the shaft may be turned. An operating spring 13, secured at one end of the shaft 9, and at the opposite end to the bracket 6, is coiled about said shaft 9 and is adapted to be wound by means of handle 12.

Mounted within the case adjacent the roll 3, is a control shaft 14, and on this shaft, adjacent the respective ends thereof, are mounted disks 15, having peripheral radially projecting spurs or teeth 16. The edges of the films designed for use with the improved camera, are formed with openings 17, arranged to coöperate with the respective spurs 16, so that, in each movement of the film, the control shaft 14 is rotated through such described engagement.

A release means for the control shaft is mounted upon the inner surface of one side wall of the case 1, and comprises a disk 18, rotatably supported upon a stub shaft 19, fixed in the case wall. The disk 18 is peripherally notched at 20 to receive a pin 21 projecting from the case wall, and thereby limiting the movement of the disk in both directions. The disk 18 is further provided at the axis thereof with a crescent shaped stop 22, and a pin 23 projects from the adjacent spur disk 15 to coöperate with said stop 22 in a manner to be later described. 24 indicates the usual conduit for the shutter operating wire 25, set by the usual button 26. For this invention, the wire 25 is coupled to an additional wire 27, operating in the branch conduit 28, and terminating beyond the said conduit in a trip block 29, formed with a notch 30, to coöperate with the projection 31, on the edge of the disk 18. A spring 32 is arranged to move the wire 27, and trip block 29 upwardly upon release of the pressure on the button 26.

The invention also contemplates means for governing the speed of the film change, for which purpose the control shaft 14 is extended beyond one side wall of the case and provided with a fixed mutilated gear 33 and with a free gear 34 connected to a coil spring 35, with one end of the latter fixed to a frame 36 secured to the case wall. A dash pot 37 having the usual regulatable vent 37' is secured upon the side of the case above the gears 33 and 34, and the piston rod 38 of such dash pot construction is provided with a rack 39 adapted to engage both gears 33 and 34, held against separation therefrom by a pin 40.

With the parts assembled as described, and the receiving roll 3 under operative tension through the spring 13, it will be noted that the film will be held against movement, that is in exposure position, by the engagement of such film with the disks 15, the said disks being held against movement by the engagement with the pin 23 on one of such disks 15, with the crescent shaped stop 22. The stop is held at one limited movement by the end wall of the notch 20 of the disk 18, with the fixed pin 21 secured to the case. In this position, the piston of the dash pot is at its lower limited movement, and the rack 39 is also lowered so that the gears 33 and 34 engage with the upper teeth of said rack. The button 26 is now operated to actuate the shutter. This movement of the button depresses the trip block 29 so that the notch 30 thereof is below the projection 31 of the disk 18. Upon release of the button 26 the spring 32 acts to draw the trip block 29 upwardly. This, through engagement with the notch 30 with the projection 31, turns the disk 18 so as to move the crescent shaped stop 22 into a position to permit the passage of the pin 23. The control shaft 14 is thus released, and the spring 13 through the gears 10 and 11 actuates the roller 4 to draw the film off the roller 3 to position a fresh section of the film for exposure. In this movement of the film, the pin 23 rides around the crescent stop, and into and out of the concaved face thereof. As the pin 23 rides out of the concaved face of the crescent stop, it causes a movement of the stop to an extent to turn the disk 18 until the pin 21 engages a wall of the notch 20 in said disk to dispose said disk in its original locked position. This of course arranges the crescent stop, so that as the pin 23 reaches its initial or starting position, it will be prevented from further movement. With the disks 15 proportioned in accordance with the picture section of the particular film, it will be apparent that in this operation roll 4 will take up only a predetermined portion of such films, that is the exposed area, and will automatically position a fresh portion of such film for exposure. During this operation, the rotation of the shaft 14 has caused the gear 33 to move the rack 39 upwardly, which movement is restricted by the dash pot and hence the movement of the film is evenly and steadily governed by such dashpot. In the upward movement of the rack 39 the gear 34 is operated by such rack to tension the spring 35. As the parts reach the stop position, the gear 33 will have reached a position presenting its mutilated side to the rack, and thereby freeing the rack from such gear. The gear 34, having tensioned spring 35, is free of the influence of shaft 14, and hence the spring will operate to return said gear to its original position, and this movement, as the gear is in engagement with the rack 39, will draw the rack downwardly to position it for the next retarding operation.

As thus arranged, it is apparent that all that is necessary for the operator to do is to see that the film is engaged with the teeth of the disks 15, and that the shaft 9 is turned to properly tension the spring 13.

Claims:

1. A film camera including a spring actuated receiving roll, a shaft having disks provided with teeth to engage openings in the film, a stop disk having a crescent shaped stop, a pin projecting from one of the two disks to engage said stop, and means for tripping the disk to release the stop.

2. A film camera including a spring actuated receiving roll, a shaft having disks provided with teeth to engage openings in the film, a stop mounted on one of the disks, and means for engaging the stop adapted to be tripped to permit a predetermined movement of the disks.

3. A film camera including a spring actuated receiving roll, a shaft having disks provided with teeth to engage openings in the film, and means engaging with the disks adapted to be released to permit a predetermined movement thereof.

4. A film camera including a spring actuated receiving roll, a shaft having disks provided with teeth to engage openings in the film, a stop disk having a stop, a pin projecting from one of the two disks to engage said stop, and means for tripping the disk to release the pin.

5. A film camera including a spring actuated receiving roll, a shaft having disks provided with teeth to engage openings in the film, a stop disk having a crescent-shaped stop, a pin projecting from one of the two disks to engage said stop, means for tripping the disk to release the stop, and means for governing the speed of rotation of the disks.

6. A film camera including a spring actuated receiving roll, a shaft having disks provided with teeth to engage openings in the film, a stop disk having a crescent-shaped stop, a pin projecting from one of the two disks to engage said stop, means for tripping the disk to release the stop, a dash pot connected with the disks in such a manner as to retard the rotative speed thereof.

7. A film camera including a spring actuated receiving roll, a shaft having disks provided with teeth to engage openings in the film, a stop disk having a crescent-shaped stop, a pin projecting from one of the two disks to engage said stop, means for tripping the disk to release the stop, a dash pot, and connections between the dash pot and said shaft.

8. A film camera including a spring actuated receiving roll, a shaft having disks provided with teeth to engage openings in the film, a stop disk having a crescent-shaped stop, a pin projecting from one of the two disks to engage said stop, means for tripping the disk to release the stop, a dash pot having a piston therein, gears mounted on the shaft, a rack bar connected with the piston and engaging the gears, whereby the piston and dash pot will retard the rotative speed of the shaft.

9. A film camera including a spring actuated receiving roll, a shaft having disks provided with teeth to engage openings in said film, a stop disk having a crescent-shaped stop, a pin projecting from one of the two disks to engage said stop, means for tripping the disk to release the stop, a dash pot having a piston therein, a mutilated gear rigidly mounted on the shaft and a gear loosely mounted on said shaft adjacent the mutilated gear, a rack bar connected with the piston and engaging with the gears, and a spring connected with the second-mentioned gear and adapted to be tensioned thereby.

In testimony whereof I affix my signature in the presence of two witnesses.

JOHN L. JOHNSON.

Witnesses:
M. M. LAITI,
JAMES D. GIVNAN.